E. W. BLISS.

Improvement in Machines for making Tin Cans.

No. 4,659.

Reissued Dec. 5, 1871.

Witnesses.

C. F. Burgess.

Nathan'l Allsworth.

Inventor.

E. W. Bliss.

By Hill & Allsworth

His Attorneys

UNITED STATES PATENT OFFICE.

ELIPHALET W. BLISS, OF BROOKLYN, ASSIGNOR TO CHARLES PRATT, OF NEW YORK, N. Y.

IMPROVEMENT IN MACHINES FOR MAKING TIN CANS.

Specification forming part of Letters Patent No. 82,481, dated September 29, 1868; reissue No. 4,659, dated December 5, 1871.

*To all whom it may concern:*

Be it known that I, ELIPHALET W. BLISS, of Brooklyn, in the county of Kings and State of New York, have invented a new and useful Machine for Uniting the Tops and Bottoms of Sheet-Metal Cans; and I hereby declare the following to be a full, clear, and exact description of the same, reference being had to the accompanying drawing forming a part of this specification, in which—

Figure 1:
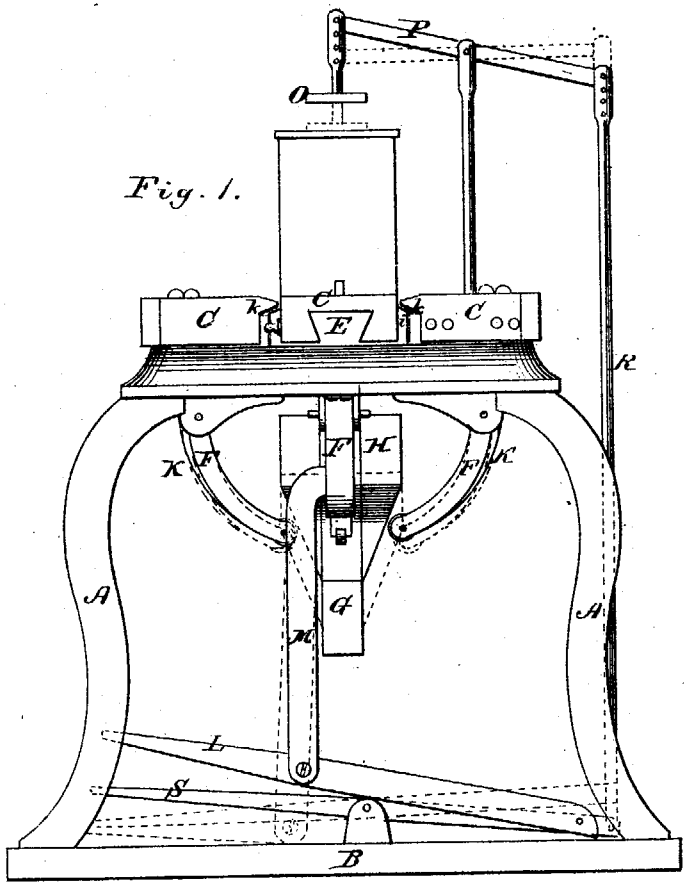
Figure 2:
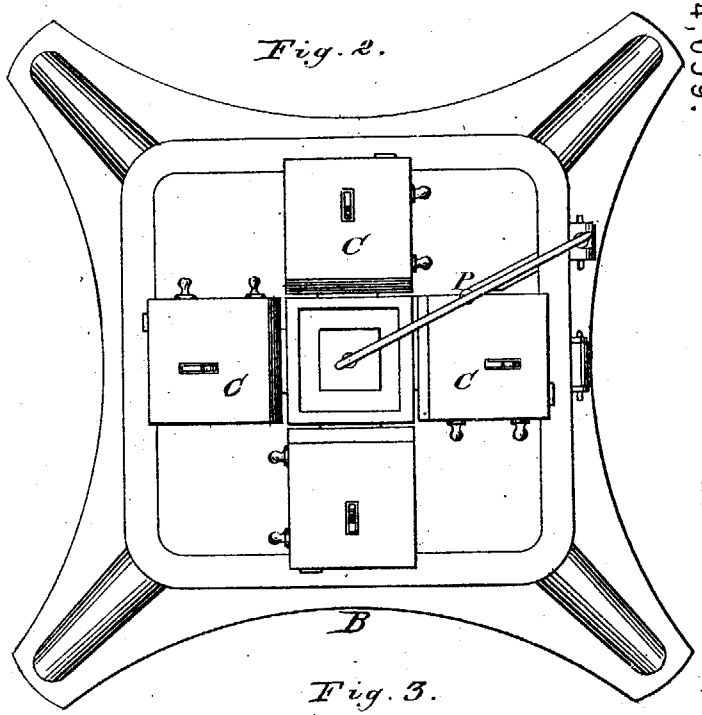
Figure 3:
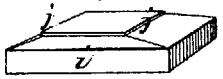

Figure 1 is a side elevation of the machine; Fig. 2, a top-plan view of the same; and Fig. 3 is a perspective view of the anvil.

Similar letters of reference in the accompanying drawing indicate corresponding parts.

The usual method of uniting the heads or ends to the bodies of sheet-metal cans is, first, to form such ends with a flange; secondly, to fit the flange over the ends of the body; and lastly, to solder the flanges to the body for the purpose of completing the connection and forming a tight joint. In some cases the flanges are formed with folds and the edges of can fitted between the folds, which are then hammered or rolled down to close the joint before being soldered. This method of construction is necessarily slow, requiring two or more distinct operations before the joints are closed and the solder applied.

My invention is designed to facilitate the work of uniting the ends to the bottom of a can by providing a machine which shall both form the flanges and unite them to the body at one operation. To this end the invention consists in two or more sliding jaws or blocks, arranged to move against the edges of the sheet of metal which is to form the end of the can, turning or bending such edges over the edges of the can-body and uniting them thereto, the can being supported upon an anvil or center piece and held in place by suitable means. The invention further consists in constructing the sliding jaws and anvil with beveled pressing-faces for the purpose of uniting the body and ends of a can with beveled or flaring joints. The invention further consists in the construction of a clamping device with the sliding jaws and anvil for the purpose of holding the can firmly in place while being united to the ends. The invention consists, lastly, in the combination of the clamping-jaws with their operating device, as will be hereinafter more fully described.

In the accompanying drawing, which illustrates one form of carrying out my invention, a suitable frame, A, is shown, which may be placed upon a cast-iron pedestal or tripod, B, to keep legs rigid when the machine is not fastened to the floor. Upon the bed-plate are arranged four sliding jaws, C, in connection with a center piece or anvil, *i*. These jaws work upon rigid guides E and are moved by levers F, as I will now proceed to describe. G is a central cam-guide rigidly fixed to the under side of the bed-plate, and upon which is placed a cam, H, having four corresponding faces, against which the rollers in the ends of the cam-levers F work. The cam-guide is made angular in cross-section to prevent the cam from turning upon it while in operation. The cam H is moved down by means of a treadle, L, provided with two connecting-rods, M, which are pivoted to the cam, and also to the treadle, in order to prevent any lateral pressure upon the former as the treadle descends. When the treadle L is released the clamping-jaws are thrown back by means of the springs K, which bear against the levers F, as shown in Fig. 1.

The operation of uniting the ends to the body of a can is as follows: The sheet of metal of the proper size to form a head or end is laid upon the anvil *i* and the body of the can placed with its open end upon it. The two are held firmly in the position by means of the plate O, which is brought down upon the upper end of the can by means of the lever P, operated by the treadle S and connecting-rod R. The clamping-jaws are now moved forward by operating the treadle L, pressing against the edges of the can-head and bending them up and upon the outside of the body. The joint thus made is very close and uniform, requiring but little solder to perfectly seal the same. The necessary solder may be applied by "dipping" or with the ordinary soldering-iron. The anvil *i* is provided with a beveled face, *j*, upon each side of its raised center, and the jaws are formed with correspondingly-beveled surfaces *k* upon their under sides, so that when the jaws are operated to form the locking-joint they shall cause such joint to incline or flare outward. By this construction of the anvil and jaws two different joints can be made—to wit, first, a joint in which the turned edges of the can-head are parallel, or nearly so, to the sides of the can, which joint is produced by the ends of the jaws pressing the metal against the shoulders formed by the raised center of the anvil; secondly, a flaring or inclined joint formed by the beveled surfaces *j k* of the anvil and jaws, respectively.

I have shown my invention adapted to the construction of square or cubical cans; but the same principle can be applied to round cans or to any other desired form.

Having thus described my invention, what I claim as new herein, and desire to secure by Letters Patent, is—

1. In a machine for uniting the heads or ends to the bodies of sheet-metal cans, the combination of two or more clamping-jaws adapted to be moved against the edges of the can-head, a center piece or anvil to support the can, and suitable means for holding the can in place, substantially as and for the purpose specified.

2. The clamping-jaws and anvil, constructed with beveled pressing-faces, substantially as described, and for the purpose specified.

3. In combination with the anvil and clamping-jaws, a clamping device for holding the can and head upon the anvil while the jaws are being operated, substantially as described, for the purpose specified.

4. In combination with the anvil and the clamping-jaws, the levers F and sliding-cam H, substantially as described, for the purpose specified.

5. The square or pyramidal cam-slide, in combination with the rigid central guide, the cam-levers, and the clamping-jaws, substantially as described, for the purpose specified.

6. The combination of the cam-slide with the connecting-rods M and treadle L, substantially as described, for the purpose specified.

7. The arrangement and combination of the cap O, lever P, connecting-rod K, and treadle S, substantially as described, for the purpose specified.

ELIPHALET W. BLISS.

Witnesses:
WM. F. MCNAMARA,
E. A. ELLSWORTH.

(136)